United States Patent [19]

Braegas

[11] Patent Number: 5,406,490

[45] Date of Patent: Apr. 11, 1995

[54] NAVIGATION SYSTEM RESPONSIVE TO TRAFFIC BULLETINS

[75] Inventor: Peter Braegas, Hildesheim, Germany

[73] Assignee: Robert Bosch GmbH, Stuttgart, Germany

[21] Appl. No.: 927,270

[22] PCT Filed: Feb. 28, 1991

[86] PCT No.: PCT/DE91/00175

§ 371 Date: Sep. 16, 1992

§ 102(e) Date: Sep. 16, 1992

[87] PCT Pub. No.: WO91/14154

PCT Pub. Date: Sep. 19, 1991

[30] Foreign Application Priority Data

Mar. 16, 1990 [DE] Germany ............... 40 08 460.4

[51] Int. Cl.$^6$ ............... G06F 15/50; G08G 1/0969
[52] U.S. Cl. ............... 364/449; 364/436; 340/905; 340/995
[58] Field of Search ............... 364/444, 449, 457, 436, 364/446; 340/995, 905; 73/178 R

[56] References Cited

U.S. PATENT DOCUMENTS

| | | | |
|---|---|---|---|
| 4,301,506 | 11/1981 | Turco ............... | 364/436 |
| 4,907,159 | 3/1990 | Mauge et al. ............... | 364/436 |
| 4,951,211 | 8/1990 | De Villeroche ............... | 364/444 |
| 5,031,104 | 7/1991 | Ikeda et al. ............... | 364/449 |
| 5,095,532 | 3/1992 | Mardus ............... | 455/186 |
| 5,170,353 | 12/1992 | Verstraete ............... | 364/444 |
| 5,172,321 | 12/1992 | Ghaem et al. ............... | 364/444 |
| 5,187,810 | 2/1993 | Yoneyama et al. ............... | 455/34.1 |
| 5,220,507 | 6/1993 | Kirson ............... | 364/444 |
| 5,247,439 | 9/1993 | Gurmu et al. ............... | 364/424.02 |
| 5,272,638 | 12/1993 | Martin et al. ............... | 364/444 |

FOREIGN PATENT DOCUMENTS 2925656 1/1981 Germany .
3501039 7/1986 Germany .
3512127 10/1986 Germany .
3536820 4/1987 Germany .

OTHER PUBLICATIONS

Peter Braegas, "With Traffic Guidance Systems against Total Traffic Collapse," *Man Forum* magazine, pp. 26–29 (Jan. 1991, Munich, Germany).
*Funkschau*, vol. 60, No. 18, Aug. 26, 1988 (Munich) articles; W. Puengel, Elektronisch um den Stau [Electronically past the jam], pp. 43–45; "Wie funktioniert CARIN [How CARIN works.]", p. 44.

*Primary Examiner*—Michael Zanelli
*Attorney, Agent, or Firm*—Frishauf, Holtz, Goodman & Woodward

[57] ABSTRACT

A navigation system is proposed, which is connected with a receiver for receiving and evaluating traffic advisories. The traffic advisories are transferred from the receiver to the navigation system, and the navigation system takes the traffic load indicated by the traffic advisories into consideration when determining a route from the present position to the destination. This makes traffic-dependent navigation possible. The reason for not choosing the usual route is communicated to the driver of the vehicle by a read-out of the respective traffic advisories and by their display.

8 Claims, 1 Drawing Sheet

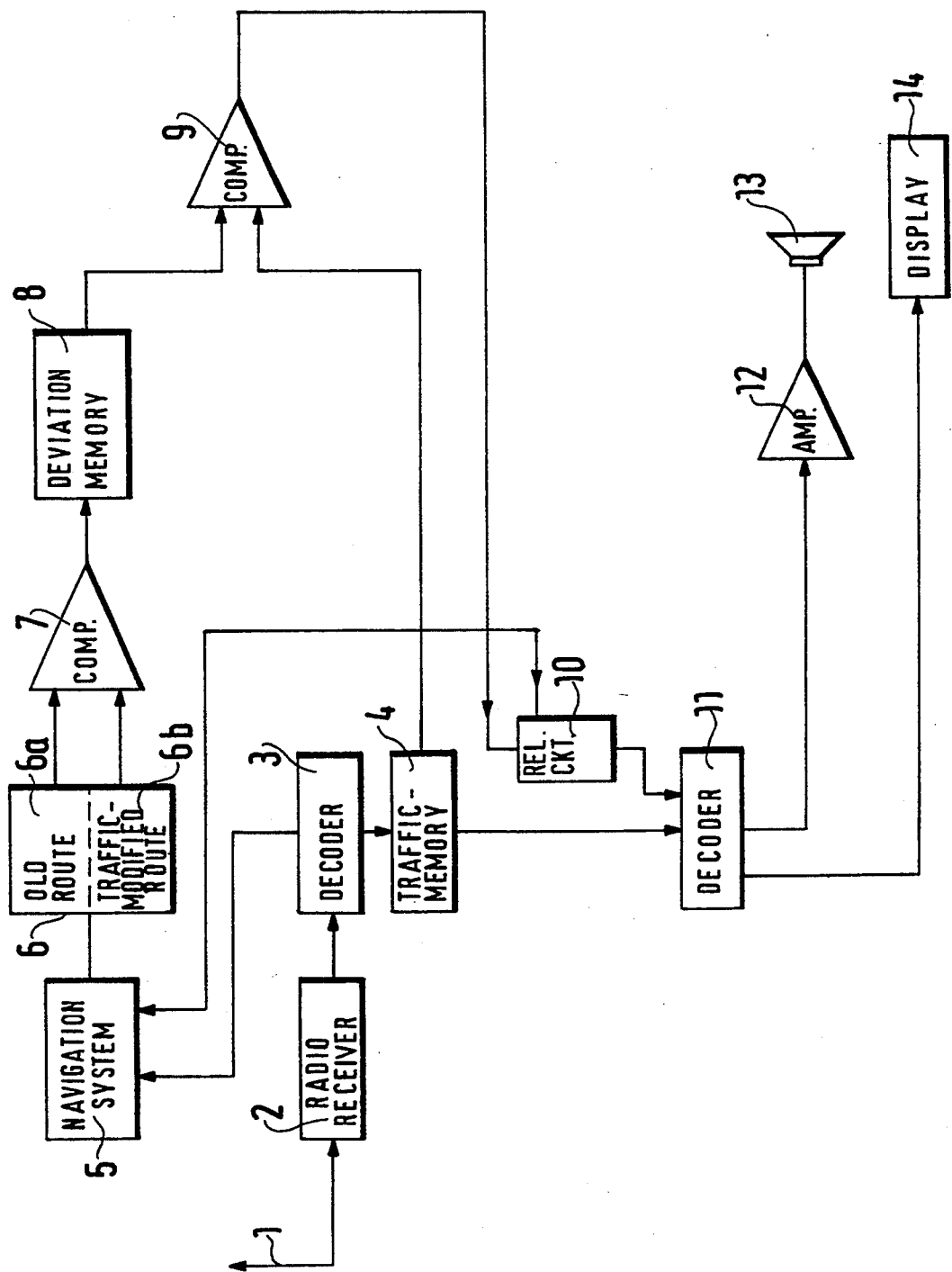

NAVIGATION SYSTEM RESPONSIVE TO TRAFFIC BULLETINS

FIELD OF THE INVENTION

The invention relates generally to a navigation system for land vehicles.

BACKGROUND

A bearing and navigation system for land vehicles is already known from German Published Patent Application DE-OS 35 12 127, Freienstein et al., by means of which it is possible to arrive at the destination in an optimal manner. If the position of the vehicle and the destination are known, the known navigation system will provide guidance to the destination in an optimal manner.

A further navigation system is known from German Published, Non-Examined Patent Application DE-OS 29 25 656 PILSAK, corresponding to U.S. application Ser. No. 159,485, filed Jun. 16, 1980, now abandoned. In this destination guidance system, data regarding the position of the bases in the terrain are transmitted to the vehicle by these bases. The travel route, which will lead to the destination, is selected by the navigation system on the basis of simultaneously transmitted possible routes.

Receivers for decoding traffic advisories are known, for example, from our German Published Patent Application DE-OS 35 36 820, Braegas & Busch/Bosch. The traffic advisories are digitally transmitted with the known radio traffic service decoder and are displayed visually or acoustically. In this connection, the traffic advisory is transmitted in a standard way, so that streets and routes as well as place names and the type of obstruction can be easily ascertained.

German Published Patent Application DE-OS 37 24 516, corresponding to U.S. Pat. No. 5,095,532, Mardus discloses and describes a method for a route-selective reproduction of traffic advisories, as well as an appropriate receiver in the vehicle, by means of which it is possible to issue only those traffic advisories which are applicable to a defined route. It is achieved, by means of this measure, that not every traffic advisory is issued, but only a limited number of traffic advisories which actually are of interest to the driver.

In known navigation systems, it is disadvantageous that the route is determined and issued without regard to traffic conditions. Although it is possible for the driver, for example in case of blocked streets, not to follow the suggested route and to take another direction instead, after which a new route is determined by the navigation system, obstructions are often not immediately apparent, for example if there is a tie-up or jam in the area of the suggested route.

ADVANTAGES OF THE INVENTION

In contrast to this, the navigation system according to the invention, has the advantage that the route determined by the navigation system takes the traffic advisory received by the radio traffic service receiver into account. The advantage of this is that tie-ups or traffic obstructions, for example, are widely bypassed because the navigation system, on the basis of the radio traffic advisories, recognizes such obstructions and takes them into consideration when searching for a route. It is achieved by this measure that it is possible to suggest alternate routes early on, so that the driver of a vehicle does not find out only when he arrives at a tie-up or a blocked street that it might have been more advantageous to take another route.

It is particularly advantageous to transmit information regarding the length of travel time over the respective route segment together with the traffic advisories and to determine a route with a minimum travel time when searching for a route. This makes it possible to weight the traffic obstruction and to suggest another route only in case of serious obstructions. It is also advantageous to determine two routes with the aid of the navigation system, one without taking traffic advisories into account and the other by taking traffic advisories into account. By means of this, it is possible to recognize route deviations and to compare these route deviations with the recommended routes. By means of this, it is possible to determine which traffic advisories to consider during the route search. If the traffic advisories are then repeated or changed, it is easy to determine whether a new route must now be determined or whether the newly received traffic advisories do not require a change of the routing, because it had been determined by taking known traffic advisories into account. Route determination becomes particularly economical by this measure.

It is particularly advantageous to provide a release circuit which releases advisories referring to the changed routing for display. By means of this, the driver of a vehicle is immediately informed of traffic obstructions in case the navigation system makes a suggestion which deviates from what is normal.

This is of particular importance, if the driver knows the route somewhat, so that a different routing makes him suspect that the navigation system is trying to deviate from the best route. It is also advantageous when the release of the traffic advisory takes place shortly prior to the point where a deviation from the old route is made. In this case, the driver is informed of actual traffic obstructions when the navigation system deviates, from the otherwise customary shortest route, because of known obstructions.

DRAWING

An exemplary embodiment of the invention is shown in the drawing and is explained in detail in the following description.

DETAILED DESCRIPTION OF THE EXEMPLARY EMBODIMENT

The drawing figure shows an antenna 1 which transmits the received signals of a radio transmitter to a radio receiver 2 installed in a vehicle. The output signal of the radio receiver 2 is supplied to a radio traffic service decoder 3 which is capable of evaluating transmitted traffic advisories. A radio traffic service decoder of this type has been described in our German Published Patent Application DE-OS 35 36 820, for example. The information evaluated by the radio traffic service decoder 3 is supplied to a traffic report memory 4, in which traffic advisories are memorized in a standard way. Such a traffic report memory is disclosed in German Published Patent Application DE-OS 37 24 516, for example. The radio traffic service information is supplied to a navigation system 5 by the radio traffic service decoder 3. Such a navigation system has been described in German Published Patent Application DE-OS 35 12 127, for example.

The navigation system 5 is connected with a memory 6, which has two memory areas 6a and 6b. The memory areas 6a and 6b can be read out to a comparator 7, which compares the contents of the memories 6a and 6b with each other and deposits route information which deviates from the memory 6b in a deviation memory 8 at its output. The data contained in the deviation memory 8 are supplied to a comparator 9, while the traffic information in the traffic report memory 4 is supplied to the other input of the comparator 9. Signals are now issued, at the output of the comparator 9, which make it possible to determine, on the basis of the traffic information in the traffic report memory 4, which routes are no longer considered in the selection of the new route.

These output signals are fed to a release circuit 10. In this case, the release circuit 10 takes care of several tasks. On one hand, it is connected with the navigation system 5. With the receipt of fresh traffic information, it is possible here to determine by means of a data transfer from the radio traffic service decoder 3 to the navigation system 5, whether or not the respective radio traffic service information had already been considered by the navigation system.

On the other hand, the navigation system 5 can inform the release circuit of the exact position of the vehicle. Now the release circuit 10 connects a decoder 11, which only switches over that information from the traffic report memory 4 which relates to the new route, i.e. where a deviation from the old route is made. The decoder 11 has outputs which lead to a display device 14 or to an amplifier 12. A loudspeaker 13 is connected to the output of the amplifier 12.

The mode of operation of the circuit layout will be described in detail below. On the basis of the position of the vehicle and the preset destination, a route is determined, in a known manner in the navigation system 5, which is intended to take the driver to his destination. This route is now stored in the memory area 6a of the memory 6.

Now, if traffic advisories are received by the receiver 2 by means of the antenna 1, these traffic advisories are processed, in a known manner, in the radio traffic service decoder 3. These traffic advisories are transferred from the radio traffic service decoder 3 to the navigation system and stored in the traffic report memory 4. By means of the route stored in the memory area 6a, the navigation system now checks to see whether this radio traffic service information is relevant in regard to the planned route. If this is not the case, the route stored in the memory area 6a is not changed. However, if the radio traffic service information does affect the route stored in the memory area 6a, the navigation system 5 calculates a new route, in which the route section, in which the radio traffic service information indicates that obstructions are to be expected, is not considered for use, and stores the new route in memory 6b.

On the basis of the information regarding the type of roads stored in the navigation system 5 and on the basis of the information relayed by the radio traffic service information regarding the type of obstruction, the two determined routes are now compared by the navigation system in respect to driving time for the average driver. In this case, the type of road (it is possible to drive faster on the superhighway than on a federal highway) and the obstruction (1 km of stop-and-go traffic requires less time than a tie-up of 5 km) are decisive. If it is found that, in spite of the obstruction the old route is faster than the newly determined route, the newly determined route is discarded and the memory area 6b is erased. But if it is found that the destination can be reached quicker on the basis of the new route, the new route for the navigation system is used to guide the driver. Thus it is achieved, by this measure, that the driver of a vehicle having the navigation system reaches his destination as quickly as possible.

A value proportional to the driving time is determined during the traffic report on the basis of the information regarding the type of road (superhighway, federal highway, secondary road) and the type of obstruction. If, for example, there is a short stretch of stop-and-go traffic on the superhighway, under given circumstances it may be more sensible to use the superhighway instead of detouring on a secondary road. However, if the road is totally blocked because of obstructions, it is necessary in any case to detour over another route. Finally, it may also happen that a considerable tie-up has developed, which would increase the driving time considerably. In this case, too, because of the information from the radio traffic service it is sensible to detour via the new route section stored in the memory area 6b.

The old route and new route stored in the memory areas 6a and 6b for routing are compared in the comparator 7 to see which routings on the old route have been changed in respect to the new route. Thus, at the end of the comparison procedure those routes, which are no longer suggested in connection with the new route, but would have been used with the old route are stored in the deviation memory 8. This information is useful, because it is possible for the navigation system to determine very quickly when new information is received whether a respective traffic report had already been considered. If the incoming unchanged traffic report relates to a route section stored in the deviation memory 8, it must be assumed that this route section had already been considered or no longer plays a role in further deliberations because it no longer needs to be considered with the new routing. Because the previously mentioned selection in regard to the driving time has already been made, it is no longer necessary for the navigation system to determine a new routing and to compare the driving times with each other. Therefore the navigation system can confine itself to the taking of bearings.

But the information contained in the deviation memory 8 can also be used in an advantageous manner for informing the driver. If the navigation system, taking the traffic obstructions into consideration, guides the driver to a new route, this will cause astonishment in a driver familiar with the area if he was not informed of the traffic obstructions. It is therefore determined in the comparator 8 for which one of the route sections deposited in the traffic report memory 4 traffic information has been stored. This comparison causes the release circuit 10 to bring the traffic information, regarding the routes stored in the deviation memory 8, to the attention of the driver.

This takes place by means of the decoder 11, which indicates this information, based on the comparison, via the release circuit 10 either acoustically, via the amplifier 12 and the loudspeaker 13, or visually, via the display device 14. By means of the release circuit, it is possible to precede the actual traffic information, for example the information "SUPERHIGHWAY A81, STUTTGART IN THE DIRECTION OF HEILBRONN, BETWEEN FEUERBACH AND ZUFFENHAUSEN, A 1-KM-LONG JAM" by the statement "THE NAVIGATION SYSTEM IS DEVIATING FROM THE SHORTEST ROUTE FOR THE FOLLOWING REASON:". In particular, the driver familiar with the area would therefore not regard the navigation system with mistrust, if he learned why the navigation system suggests a different direction of travel. The connection between the release circuit 10 and the navigation system 5 is used, on the one hand, to make the deviating routes, in connection with which the traffic information had already been considered, available to the navigation system, so that with a repeated receipt of this traffic information no route calculation is necessary and, on the other hand, to transmit the location of the vehicle from the navigation system to the release circuit. Because of this, it becomes possible to release the information to the driver shortly prior to the time when the route, which per se would be the most logical in accordance with the memory area 6a, is abandoned.

Thus, the driver of the vehicle does not receive this information that the route is being changed at a relatively early time, so that he might already have forgotten it when the deviation from the usual route occurs, but shortly prior to the time when this change in direction, which is surprising to him, takes place. It is therefore possible, in a particularly simple manner, for the driver of the vehicle to comprehend this surprising change in direction.

The digital data are processed in the decoder 11 in such a way that they can either be shown on the display device 14 or a digital voice module is used which makes it possible to issue the information verbally via the loudspeaker 13, which is already present, for example in connection with the receiver.

It is understood that the comparators 7 and 9, the release circuit 10, the decoder 11 and the memory device can be housed together with the navigation system and can be integrated into the navigation system or the receiver.

I claim:

1. A navigation system for a land vehicle with a bearing system for determining the position of the land vehicle, an input device for specifying a desired destination of the land vehicle, and with means for automatically selecting a route of the land vehicle from its starting position to the destination as a series of consecutive route sections, and with a receiver (2, 3) for receiving and evaluating standard broadcast traffic advisories which relate to respective route sections, wherein the receiver transfers the traffic advisories received to the navigation system (5), upon input of a desired destination, the navigation system (5)

automatically selects both a first route, without consideration of the traffic advisories, and a second route, taking traffic advisories into consideration, and stores said first and second routes in respective memory areas (6a, 6b), a comparator (7, 9) is provided, having respective inputs connected to outputs of said respective memory areas, and compares said first and second routes and their respective estimated driving times with each other, identifies which route sections of said first route deviate from the route sections of said second route, and determines which of said deviating route sections have been mentioned in one of said traffic advisories received by the receiver (2,3).

2. A navigation system in accordance with claim 1, wherein information regarding an estimated required driving time for each respective route section is contained in each traffic advisory, and the navigation system selects among said stored first and second routes, based upon which route offers the shortest estimated driving time.

3. A navigation system in accordance with claim 1, wherein the deviating route sections identified as having been mentioned in a received traffic advisory are stored in a deviation memory (8) for future reference.

4. A navigation system in accordance with any one of the preceding claims, wherein the traffic advisories received are stored in a traffic advisory memory (4) connected to an output of said receiver.

5. A navigation system in accordance with claim 1, further comprising means (13, 14) for providing information to a vehicle driver, and a release circuit (10), having an input connected to an output of said comparator (9), which justifies to said driver any recommended alternate route by releasing to said information providing means (13, 14) an indication as to which route section includes an obstruction to be avoided by use of said alternate route.

6. A navigation system in accordance with claim 5, wherein the indication is performed acoustically through a speaker (13).

7. A navigation system in accordance with claim 5, wherein said justifying said alternate route takes place shortly prior to the time at which deviation from a previously selected route takes place.

8. A navigation system in accordance with claim 5, wherein the indication is performed visually on a display (14).

* * * * *